(12) United States Patent
Sharma

(10) Patent No.: US 9,560,211 B2
(45) Date of Patent: Jan. 31, 2017

(54) ERROR HANDLING FOR CDR TRANSPORT WITHIN AN OFFLINE CHARGING SYSTEM

(71) Applicant: Alcatel-Lucent USA Inc., Murray Hill, NJ (US)

(72) Inventor: Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 44 days.

(21) Appl. No.: 14/296,011

(22) Filed: Jun. 4, 2014

(65) Prior Publication Data

US 2015/0358479 A1    Dec. 10, 2015

(51) Int. Cl.
*H04M 15/00*  (2006.01)
*H04W 4/24*   (2009.01)

(52) U.S. Cl.
CPC ............. *H04M 15/65* (2013.01); *H04M 15/41* (2013.01); *H04W 4/24* (2013.01)

(58) Field of Classification Search
CPC ......... H04M 15/65; H04M 15/41; H04W 4/24
See application file for complete search history.

(56) References Cited

U.S. PATENT DOCUMENTS

2003/0232615 A1* 12/2003 Kim ................. H04L 12/14 455/405
2010/0191612 A1* 7/2010 Raleigh ............ G06Q 10/06375 705/26.1
2014/0293879 A1* 10/2014 Chen .................... H04L 12/1453 370/328

OTHER PUBLICATIONS

3rd Generation Partnership Project, Charging Data Record (CDR) Transfer, 3GPP TS 32.295, Version 12.0.0 (Sep. 2013).
3rd Generation Partnership Project, Charging Data Record (CDR) File Format and Transfer, 3GPP TS 32.297, Version 12.0.0 (Mar. 2014).

* cited by examiner

*Primary Examiner* — Bryce Bonzo
*Assistant Examiner* — Katherine Lin
(74) *Attorney, Agent, or Firm* — Duft Bornsen & Fettig, LLP

(57) ABSTRACT

Systems and methods that provide error handling for CDR transport. One embodiment comprises a CGF of an offline charging system. The CGF receives an initial CDR transfer request from a CDF, identifies a data record value inserted in the initial CDR transfer request by the CDF to indicate a number of CDRs in the initial CDR transfer request, and counts the CDRs contained in the initial CDR transfer request. The CGF compares the count of CDRs contained in the initial CDR transfer request with the number of CDRs indicated by the CDF, and rejects the initial CDR transfer request if the count of CDRs does not match the number of CDRs indicated by the CDF. The CGF then assembles a CDR transfer response that includes a cause value indicating a count mismatch, and sends the CDR transfer response to the CDF.

20 Claims, 7 Drawing Sheets

GTP' HEADER

DATA RECORD TRANSFER REQUEST

| INFORMATION ELEMENT (IE) | PRESENCE REQUIREMENT |
| --- | --- |
| PACKET TRANSFER COMMAND | MANDATORY |
| DATA RECORD PACKET | CONDITIONAL |
| SEQUENCE NUMBERS OF RELEASED PACKETS | CONDITIONAL |
| SEQUENCE NUMBERS OF CANCELLED PACKETS | CONDITIONAL |
| PRIVATE EXTENSION | OPTIONAL |

DATA RECORD PACKET
INFORMATION ELEMENT (IE)

| |
|---|
| TYPE = 252 |
| LENGTH |
| NUMBER OF DATA RECORDS |
| DATA RECORD FORMAT |
| DATA RECORD FORMAT VERSION |
| LENGTH OF DATA RECORD 1 |
| DATA RECORD 1 |
| |
| LENGTH OF DATA RECORD *N* |
| DATA RECORD *N* |

DATA RECORD TRANSFER RESPONSE

| INFORMATION ELEMENT (IE) | PRESENCE REQUIREMENT |
|---|---|
| CAUSE | MANDATORY |
| REQUESTS RESPONDED | MANDATORY |
| PRIVATE EXTENSION | OPTIONAL |

DATA RECORD TRANSFER REQUEST

| INFORMATION ELEMENT (IE) | PRESENCE REQUIREMENT |
|---|---|
| PACKET TRANSFER COMMAND | MANDATORY |
| DATA RECORD PACKET | CONDITIONAL |
| SEQUENCE NUMBERS OF RELEASED PACKETS | CONDITIONAL |
| SEQUENCE NUMBERS OF CANCELLED PACKETS | CONDITIONAL |
| AMENDMENT INDICATOR | CONDITIONAL |
| PRIVATE EXTENSION | OPTIONAL |

1002

ERROR HANDLING FOR CDR TRANSPORT
WITHIN AN OFFLINE CHARGING SYSTEM

TECHNICAL FIELD

The present disclosure is related to the field of communication systems and, in particular, to offline charging.

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online billing functions to keep track of the charges incurred by each device for using the various services. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS).

The CDF receives the charging events from one or more CTFs, and uses the information included in the charging events to construct CDRs. A CDR is a formatted collection of information about a chargeable event (e.g., time of call set-up, duration of the call, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), provides additional processing including CDR validation, enrichment and optionally correlates the CDRs before storing them into a CDR file, and makes the CDR file available to the billing domain (see 3GPP TS 32.297).

Errors may occur when a CDF sends CDRs to a CGF. Unfortunately, the standards do not address some of the errors that may occur in the transport of CDRs between a CDF and a CGF.

SUMMARY

Embodiments described herein add reliability to the transport of CDRs between a CDF and a CGF for offline charging. When implementing offline charging, a CDF sends one or more CDRs to the CGF in a message, such as a GTP' Data Record Transport Request. The CDF includes the data for the CDRs in the message, a value which indicates how many CDRs the CDF is attempting to insert in the message, and other information. To add reliability when transporting the CDRs, the CGF is able to verify whether the message actually contains the same number of CDRs as indicated by the CDF. If there is a mismatch between the number of CDRs contained in the message and the number of CDRs indicated by the CDF, then the CGF is able to notify the CDF of the mismatch. The CDF can then attempt to fix the problem that caused the mismatch, and resend the message with the correct information.

One embodiment comprises a CGF of an offline charging system. The CGF is configured to receive an initial CDR transfer request from a CDF, to identify a data record value inserted in a field of the initial CDR transfer request by the CDF to indicate a number of CDRs in the initial CDR transfer request, and to count the CDRs contained in the initial CDR transfer request, and to compare the count of CDRs contained in the initial CDR transfer request with the number of CDRs indicated in the field of the initial CDR transfer request. The CGF is configured to reject the initial CDR transfer request if the count of CDRs contained in the initial CDR transfer request does not match the number of CDRs indicated in the field of the initial CDR transfer request, to assemble a CDR transfer response that includes a cause value indicating a count mismatch, and to send the CDR transfer response to the CDF.

In another embodiment, the initial CDR transfer request comprises a GTP' Data Record Transfer Request. The CGF is configured to process a Data Record Packet Information Element (IE) in the GTP' Data Record Transfer Request to identify the data record value, and to count the CDRs contained in the GTP' Data Record Transfer Request.

In another embodiment, the CDR transfer response comprises a GTP' Data Record Transfer Response, and the cause value is defined for the GTP' Data Record Transfer Response to indicate a count mismatch in a Data Record Transfer Request.

In another embodiment, the CDF is configured to receive the CDR transfer response from the CGF that includes a cause value indicating a count mismatch, to reassemble the initial CDR transfer request to generate an amended CDR transfer request, to insert an amendment indicator in the amended CDR transfer request, and to send the amended CDR transfer request to the CGF. The CDF is configured to receive another CDR transfer response from the CGF for the amended CDR transfer request indicating that the amended CDR transfer request was accepted by the CGF, and to delete an entry related to a sequence number from a send buffer.

In another embodiment, the amended CDR transfer request comprises a GTP' Data Record Transfer Request, an Information Element (IE) is defined in the GTP' Data Record Transfer Request for the amendment indicator.

Another embodiment comprises a method for CDR transfer in offline charging. The method includes receiving an initial CDR transfer request from a CDF in a CGF of an offline charging system. The method includes identifying a data record value inserted in a field of the initial CDR transfer request by the CDF to indicate a number of CDRs in the initial CDR transfer request, counting the CDRs contained in the initial CDR transfer request, and comparing the count of CDRs contained in the initial CDR transfer request with the number of CDRs indicated in the field of the initial CDR transfer request. The method includes rejecting the initial CDR transfer request if the count of CDRs contained in the initial CDR transfer request does not match the number of CDRs indicated in the field of the initial CDR transfer request, assembling a CDR transfer response that includes a cause value indicating a count mismatch, and sending the CDR transfer response to the CDF.

Another embodiment comprises a CDF configured to communicate with a CGF of an offline charging system to transfer CDRs. The CDF is configured to assemble an initial CDR transfer request for a transaction, to insert CDRs in the initial CDR transfer request, to insert a data record value in a field of the initial CDR transfer request to indicate a number of CDRs in the initial CDR transfer request, and to send the initial CDR transfer request to the CGF. The CDF is configured to receive a CDR transfer response for the transaction from the CGF that includes a cause value indicating a count mismatch between the data record value inserted by the CDF and a number of CDRs contained in the initial CDR transfer request as received by the CGF. The CDF is configured to reassemble the initial CDR transfer request to generate an amended CDR transfer request, to insert an amendment indicator in the amended CDR transfer request, and to send the amended CDR transfer request to the CGF.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the disclosure are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
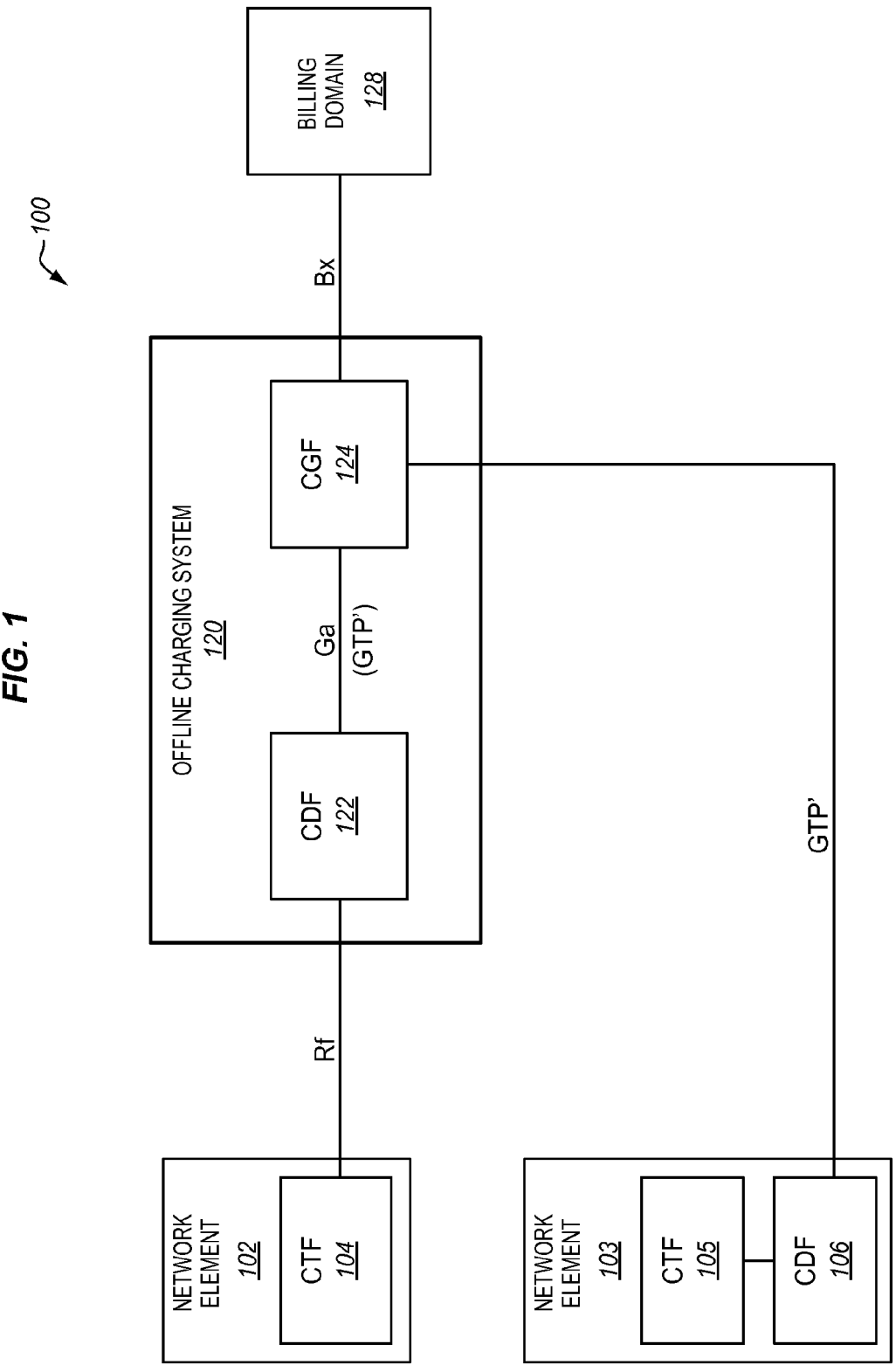
FIG. 1 illustrates an offline charging architecture.

FIG. 1 illustrates an offline charging architecture 100. Architecture 100 may be implemented in a circuit-switched network or a packet-switched network that provides services to its subscribers (i.e., end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes network elements 102-103 that connect to an offline charging system (OFCS) 120. A network element 102-103 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 connects to OFCS 120 over a Diameter Rf interface. Therefore, CTF 104 assembles the charging information into accounting requests, such as a Diameter Rf Accounting Request (ACR), and sends the accounting requests to OFCS 120 via the Diameter Rf interface. Although not specifically illustrated in FIG. 1, network element 102 may include a processor or other hardware component to implement CTF 104.

Network element 103 includes a CTF 105, and also includes a Charging Data Function (CDF) 106. CTF 105 detects chargeable events for services provided by network element 103, assembles information for the chargeable events into matching charging events, and sends the charging events to CDF 106. CDF 106 formats the charging information received from CTF 105 into CDRs, and forwards the CDRs to a Charging Gateway Function (CGF) within OFCS 120. In the case of network element 103, CDF 106 connects to OFCS 120 over an interface using GPRS Tunneling Protocol prime (GTP'). GTP' is an IP-based protocol that is used for transporting charging information. CDR transport using GTP' is defined in the 3GPP specifications, such as TS 32.295 and TS 32.297.

OFCS 120 is an apparatus, a server, a device, or equipment configured to implement offline charging for sessions or services provided by a network. Offline charging can be of two types: session-based or event-based. In event-based charging, the CTF reports the usage or the service rendered where the service offering is rendered in a single operation, such as subscriber registration, re-registration, de-registration, etc. The CTF reports the usage in an ACR EVENT. Session-based charging is the process of reporting usage reports for a session, and uses the START, INTERIM, and STOP accounting data. During a session, CTF may transmit multiple ACR Interims depending on the proceeding of the session.

OFCS 120 includes a CDF 122 and a CGF 124. CDF 122 comprises an element or module within OFCS 120 that receives charging events from CTFs within network elements, formats the charging events into CDRs, and sends the CDRs to CGF 124. CDF 122 communicates with CGF 124 over a Diameter Ga interface. In the case shown in FIG. 1, GTP' is used on the Ga interface to transport CDRs from CDF 122 to CGF 124. CGF 124 comprises an element or module within OFCS 120 that correlates CDRs for a session, and forwards a CDR file with the correlated CDRs to a billing domain 128. Billing domain 128 is the part of the operator network that receives and processes CDR files for billing mediation and other billing applications (e.g., statistical applications). Although not specifically illustrated in FIG. 1, OFCS 120 may include one or more processors or other hardware components that implement CDF 122 and CGF 124.

Figures 2, 3:
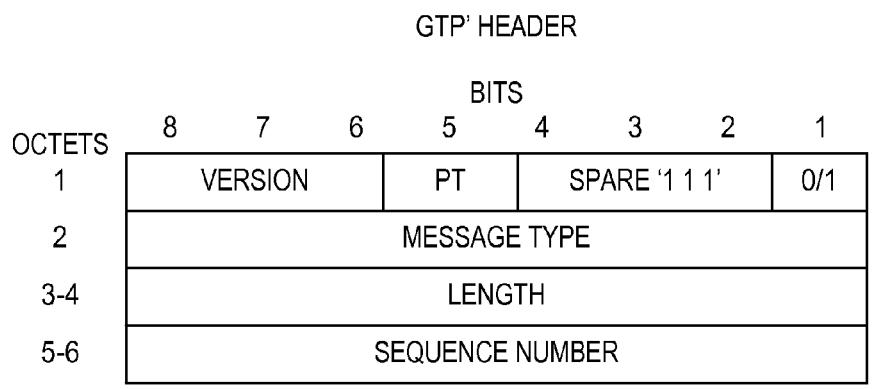
FIG. 2 illustrates a GTP' header.
FIG. 3 illustrates Information Elements (IE) specified for a Data Record Transfer Request.

GTP' is designed to deliver CDRs from CDF 122 (or CDF 106) to CGF 124. To transfer CDRs, CDF 122 generates a message with a GTP' header. FIG. 2 illustrates a GTP' header. The first octet of the GTP' header indicates the version of GTP' (bits 6-8) being utilized, and the protocol type (PT) flag (bit 5). Octet 2 indicates the "Message Type" for the message. For example, the message type may be "Node Alive Request", "Node Alive Response", "Redirection Request", "Redirection Response", "Data Record Transfer Request", "Data Record Transfer Response", etc. Octets 3-4 of the GTP' header indicate the "Length" of the payload (i.e., the number of octets after the header). Octets 5-6 indicate the "Sequence Number". GTP' uses request/response transactions. Each transaction is indicated by a sequence number in the range of 0-65535.

The GTP' message generated by CDF 122 also includes a payload. The payload includes one or more Information Elements (IE) that is appended to the header depending on the type of message being sent. For example, a Data Record Transfer Request is used to transport CDRs in GTP'. FIG. 3 illustrates the IEs specified for a Data Record Transfer Request. In this request, one of the IE's is "Packet Transfer Command", which specifies the nature of the message. The values of the Packet Transfer Command may be as follows:

1='Send Data Record Packet';
2='Send possibly duplicated Data Record Packet';
3='Cancel Data Record Packet';
4='Release Data Record Packet'.

Figures 4, 5, 6:
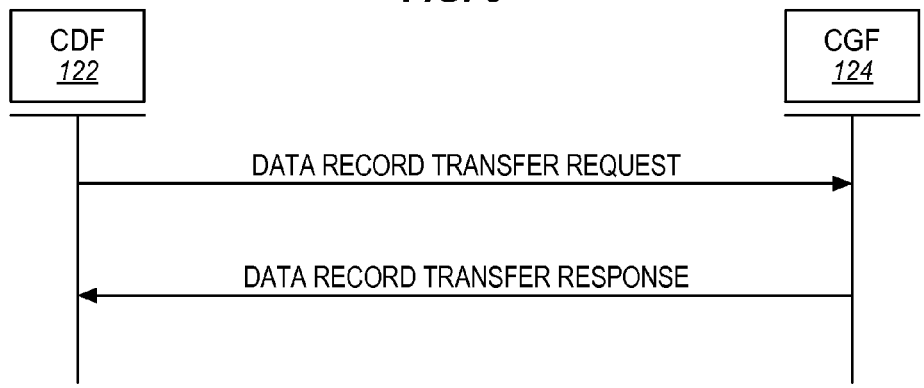
FIG. 4 illustrates a Data Record Packet Information Element (IE).
FIG. 5 illustrates a CDR transfer from a CDF to a CGF.
FIG. 6 illustrates Information Elements (IE) specified for a Data Record Transfer Response.

Another of the IE's is "Data Record Packet", which is the IE that stores the CDRs for transport. Because the "Data Record Packet" stores CDRs, the CDRs are sometimes referred to as being transported in a packet or data record packet. FIG. 4 illustrates a Data Record Packet IE. The first field (octet 1) of the Data Record Packet IE indicates the type of the IE (a value of 252=Data Record Packet). The second field (octets 2-3) of the Data Record Packet IE is the "Length" field that indicates the length of the IE. The third field (octet 4) is the "Number of Data Records" field that indicates the number of data records (i.e., CDRs) inserted in the IE. The fourth field (octet 5) indicates the format of the CDRs (e.g., ASN.1). The fifth field (octets 6-7) indicates the 3GPP Technical Specifications release and version number used for CDR encoding. The remaining fields are for the CDRs. A "Length of Data Record" field and a "Data Record" field are used for each CDR being transported to indicate a length of the CDR, and to store the information for the CDR. This IE may contain 0, 1, . . . , n data records.

Referring back to FIG. 3, the other IEs for the Data Record Transfer request are "Sequence Numbers of Released Packets", "Sequence Numbers of Cancelled Packets", and "Private Extension".

FIG. 5 illustrates a CDR transfer from CDF 122 to CGF 124. To transfer CDRs in a conventional manner, CDF 122 assembles a Data Record Transfer Request by populating the GTP' header of the request. This includes inserting a value into the "Message Type" field to indicate a Data Record Transfer Request (see FIG. 2), and also includes inserting sequence number that is assigned to this transaction into the "Sequence Number" field. CDF 122 also populates the IE's of the Data Record Transfer Request, which includes populating the Data Record Packet IE with the CDRs being transported. CDF 122 then sends the Data Record Transfer Request to CGF 124.

In order to support error handling, CDF 122 maintains an internal send buffer of the pending transactions. Thus, CDF 122 stores the sequence numbers for requests not yet successfully responded to by the primary CGF (CGF 124). If CDF 122 were to lose its connection to CGF 124 (e.g., due to a link failure or CGF 124 going down), CDF 122 may attempt to redirect the CDR traffic to a secondary CGF (not shown in FIG. 1).

When CGF 124 receives the Data Record Transfer Request, CGF 124 opens the request and stores its contents (e.g., in a non-volatile memory). CGF 124 then assembles a Data Record Transfer Response, and sends the Data Record Transfer Response back to CDF 122 (assuming the connection is still available). FIG. 6 illustrates the IEs specified for a Data Record Transfer Response. One of the IE's is "Cause", which indicates the status of one or more Data Record Transfer Requests. For example, the cause value of "Request Accepted" indicates that a Data Record Transfer Request was successfully received, while the cause value of "No Resources Available" indicates that a Data Record Transfer Request was not successfully received. Another one of the IE for the Data Record Transfer Response is "Requests Responded". Because a Data Record Transfer Response may be used to answer for one or more Requests, this IE indicates the sequence numbers of the Data Record Transfer Requests for which this Response is answering. The Private Extension IE contains vendor or operator specific information.

In FIG. 5, it is assumed that the Data Record Transfer Request was successfully received, so CGF 124 populates the Data Record Transfer Response with a cause value ("Request Accepted") indicating a successful packet reception, and sends the response to CDF 122. After the positive response is received, CDF 122 deletes the information for the transaction(s) related to the sequence number provided in the response.

Although FIG. 5 illustrates a successful transfer of a CDR packet from CDF 122 to CGF 124, there may be instances where the transfer encounters problems. The 3GPP has defined error handling for CDR transport (e.g., CGF redundancy), but these error handling mechanisms may not be effective for all scenarios.

Figure 7:
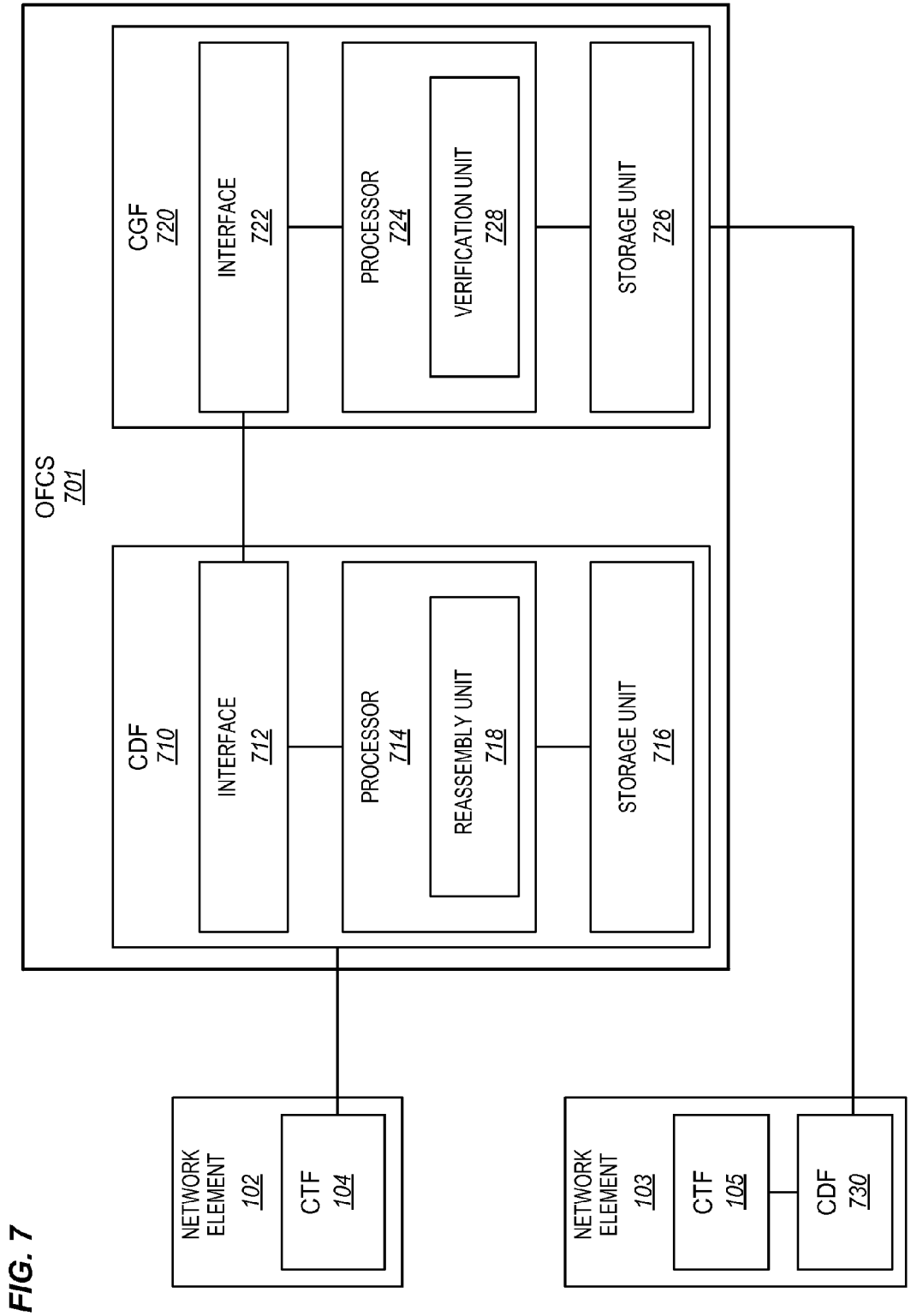
FIG. 7 illustrates an offline charging architecture in an exemplary embodiment.

The embodiments described below provide an added error handling mechanism for CDR transport. FIG. 7 illustrates an offline charging architecture 700 in an exemplary embodiment. Architecture 700 includes an OFCS 701 having a CDF 710 coupled to a CGF 720. In this embodiment, CDF 710 includes an interface 712, a processor 714, and a storage unit 716. Interface 712 comprises a component (e.g., hardware, software, or a combination of hardware and software) for communicating with CGF 720. Interface 712 may use GTP' or another protocol for communication. Processor 714 comprises a component that performs the functions of a CDF. Storage unit 716 comprises a component that stores data, such as a memory. In this embodiment, CDF 710 includes a reassembly unit 718, which is a component (e.g., hardware, software, or a combination of hardware and software) that is able to reassemble a request for transporting CDRs in response to a particular cause value from CGF 720. A more detailed explanation of reassembly unit 718 is provided below. CDF 730 is illustrated as being implemented in a network element 103, and this CDF may have a similar configuration and operation as CDF 710.

CGF 720 includes an interface 722, a processor 724, and a storage unit 726. Interface 722 comprises a component (e.g., hardware, software, or a combination of hardware and software) for communicating with CDF 710. Interface 722 may use GTP' or another protocol for communication, as standards specifications allow the use of a proprietary protocol if CDF 710 and CGF 720 are hosted on the same platform. Processor 724 comprises a component that performs the functions of a CGF. Storage unit 726 comprises a component that stores data, such as a memory. In this embodiment, CGF 720 includes a verification unit 728, which is a component (e.g., hardware, software, or a combination of hardware and software) that is able to verify that a request received from CDF 710 includes a specified number of CDRs. A more detailed explanation of verification unit 728 is provided below.

Figure 8:
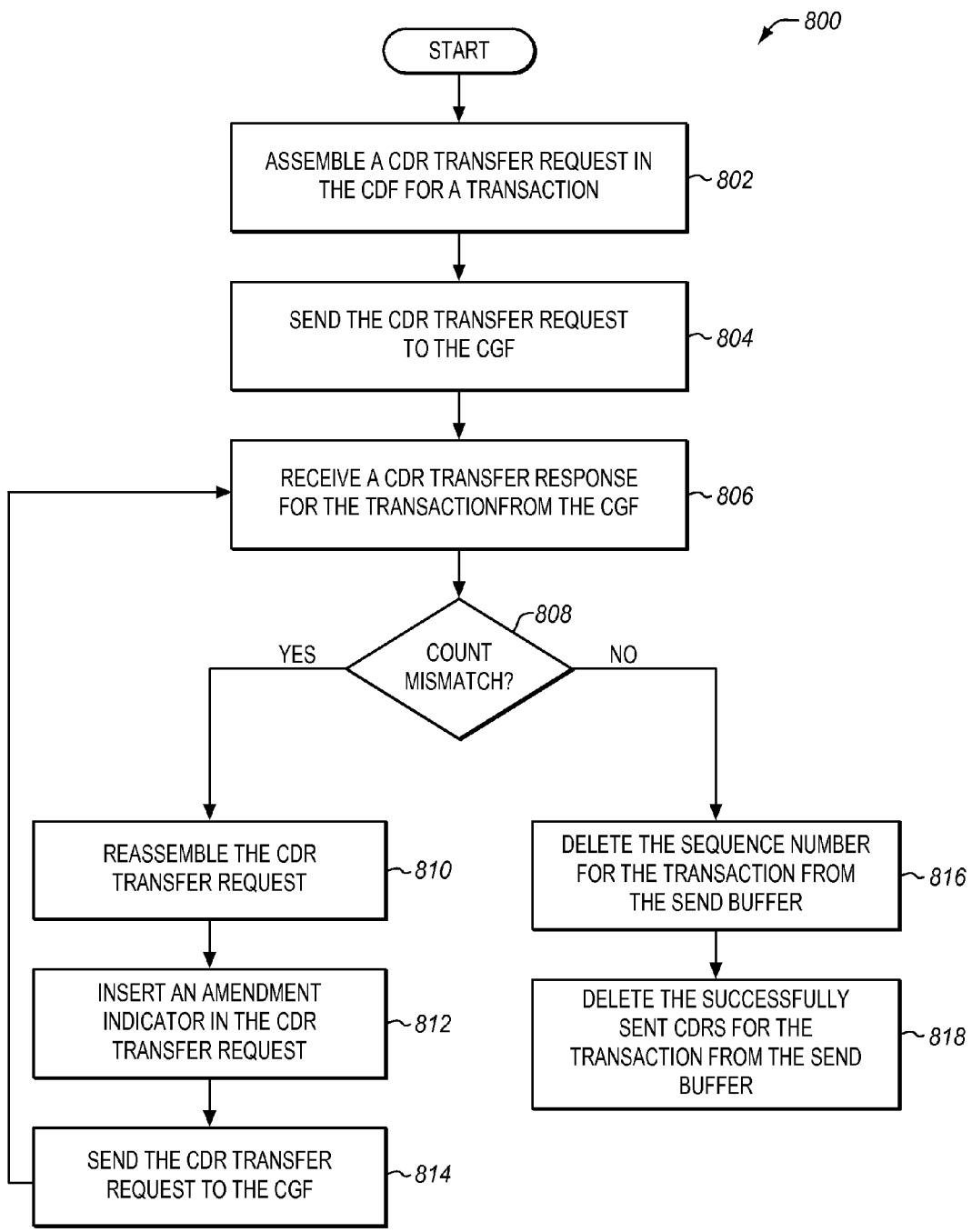
FIGS. 8-9 are flow charts illustrating processes for error handling in CDR transport in an exemplary embodiment.
Figure 9:
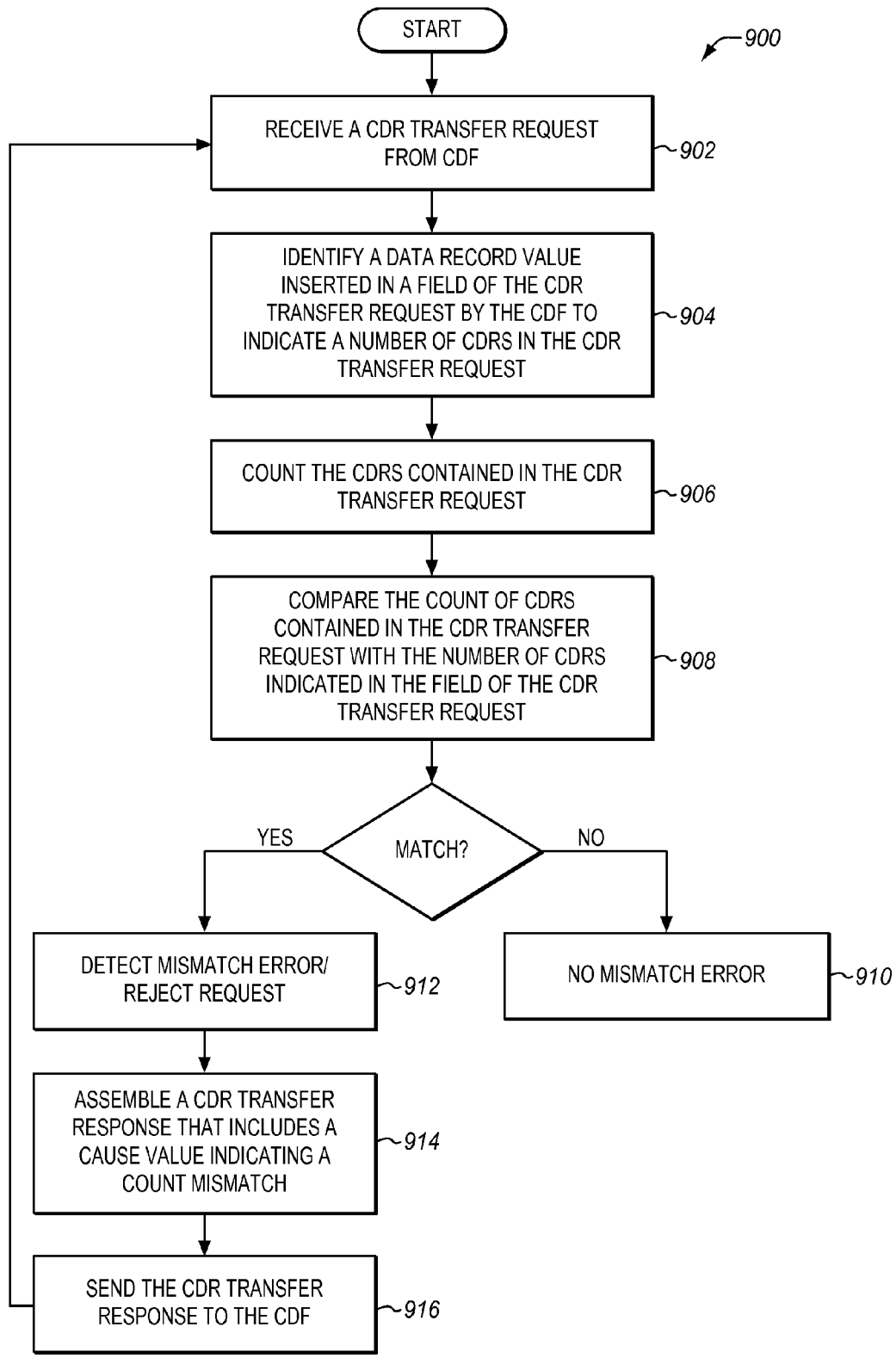

It is assumed for this embodiment that CDF 710 is prepared to transfer CDRs to CGF 720. FIGS. 8-9 are flow charts illustrating processes for error handling in CDR transport in an exemplary embodiment. The process 800 shown in FIG. 8 is performed in CDF 710. To transfer CDRs to CGF 720, processor 714 in CDF 710 assembles a CDR transfer request for a transaction (step 802). In assembling the request, processor 714 assigns a sequence number for the transaction, and inserts the sequence number in the CDR transfer request (e.g., in a header of the request). For example, if GTP' is used, then processor 714 populates the "Sequence Number" field of the GTP' header with the sequence number for the transaction (see FIG. 2). Processor 714 also inserts CDR information in a payload of the request. Processor 714 may insert one or more CDRs in fields of the request. Processor 714 also inserts a value (referred to as a data record value) in a field of the request indicating the number of CDRs inserted in the request. For example, if GTP' is used, then processor 714 may insert the CDRs in the Data Record Packet IE (e.g., in Data Record 1-$n$), and may insert the data record value in the "Number of Data Records" field to indicate the number of CDRs inserted in the IE.

Processor 714 also maintains a send buffer in storage unit 716. Processor 714 stores an entry for the transaction (i.e., for the request) that is referenced by the sequence number in the send buffer. Processor 714 uses the send buffer to store information on transactions that are not successfully responded to by CGF 720 (i.e., its primary CGF). Processor 714 may also store information for the CDRs that were sent during this transaction.

Processor 714 then sends the CDR transfer request to CGF 720 through interface 712 (step 804). Because this is the first request for this transaction, the request may be referred to as the initial CDR transfer request.

The process 900 shown in FIG. 9 is performed in CGF 720. CGF 720 receives the initial CDR transfer request from CDF 710 through interface 722 (step 902). Processor 724 in CGF 720 opens the request, and stores the packet contents in storage unit 726. CGF 720 is enhanced in this embodiment with verification unit 728 that is able to determine whether certain data in the initial CDR transfer request is accurate. To do so, verification unit 728 (as provided by processor 724) identifies the data record value inserted in a field of the initial CDR transfer request by CDF 710 to indicate a number of CDRs ("M") in the initial CDR transfer request (step 904). For example, if GTP' is used, then verification unit 728 may process the "Number of Data Records" field of the Data Record Packet IE to identify the data record value (see FIG. 4). Verification unit 728 also counts the CDRs ("N") contained in the initial CDR transfer request (step 906). For example, if GTP' is used, then verification unit 728 may process the Data Record Packet IE to count the number of data records contained in this IE (see FIG. 4, Data Records 1-$n$).

Verification unit 728 then compares the count of CDRs (N) contained in the initial CDR transfer request with the number of CDRs (M) indicated in the field of the initial CDR transfer request (step 908) to detect whether or not there is a mismatch. If there is a match (M=N), then verification unit 728 does not detect a mismatch error (step 910) and may accept the initial CDR transfer request. CGF 720 may thus handle the initial CDR transfer request in a normal manner to assemble a CDR transfer response, which may include further error detection.

If there is a mismatch (W/N), then verification unit 728 detects a mismatch error and rejects the initial CDR transfer request (step 912). Verification unit 728 assembles a CDR transfer response for the initial CDR transfer response that includes a cause value indicating a count mismatch (step 914). For example, if GTP' is used, then a new cause value may be defined in GTP' to indicate a count mismatch in a Data Record Transfer Request. The new cause value may be "Count Mismatch". Verification unit 728 then sends the CDR transfer response to CDF 710 through interface 722 (step 916).

Referring back to FIG. 8, processor 714 within CDF 710 receives the CDR transfer response from CGF 720 (step 806) for the initial CDR transfer request. CDF 710 is enhanced with reassembly unit 718 that is able to process the CDR transfer response. Reassembly unit 718 processes the CDR transfer response to determine whether a count mismatch was identified in the CDR transfer request (step 808). Other checks performed normally are not indicated in FIG. 8. These checks may include additional processing to be performed based on the response from CGF 720 and remain unchanged. If the CDR transfer request was not accepted by CGF 720 due to a count mismatch, then reassembly unit 718 reassembles the initial CDR transfer request to generate an amended CDR transfer request (step 810). Reassembly unit 718 may reassemble the initial CDR transfer request in any desired manner. For example, if reassembly unit 718 is notified by CGF 720 that there is a count mismatch between the number of CDRs contained in the initial CDR transfer request and the value inserted in the initial CDR transfer request to indicate the number of CDRs in the initial CDR transfer request, then reassembly unit 718 may simply reassign the value in the initial CDR transfer request to indicate the correct number of CDRs, or reassemble the data request packet afresh. Reassembly unit 718 may take further steps to address the error indicated by CGF 720 to generate the amended CDR transfer request.

Figures 10, 11:
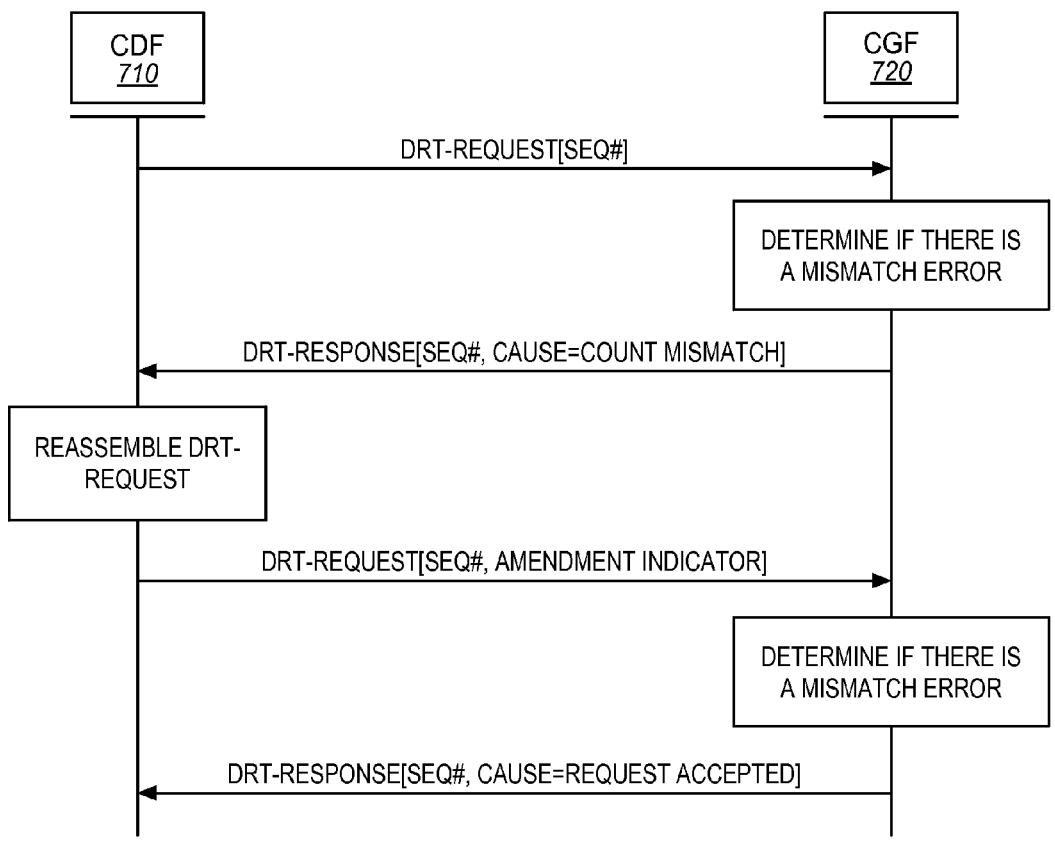
FIG. 10 illustrates a Data Record Transfer Request with an Amendment Indicator Information Element (IE) in an exemplary embodiment.
FIG. 11 illustrates CDR transport using GTP' in an exemplary embodiment.

Reassembly unit 718 also inserts an amendment indicator in the amended CDR transfer request (step 812). For example, if GTP' is used, then reassembly unit 718 may insert the amendment indicator in a new IE defined for a Data Record Transfer Request. FIG. 10 illustrates a Data Record Transfer Request with an Amendment Indicator IE in an exemplary embodiment. The Amendment Indicator IE 1002 is an extension or enhancement to the Data Record Transfer Request in GTP'. The Amendment Indicator IE 1002 is defined as a conditional IE, and is used when a corrected data packet is sent from CDF 710 to CGF 720 in response to having received an earlier rejection with a cause value of "Count Mismatch".

Reassembly unit 718 maintains the same sequence number in the amended CDR transfer request as was assigned to the initial CDR transfer request for the transaction. Reassembly unit 718 does not declare the amended CDR transfer request as a "potentially duplicated Data Record Packet", as the amended CDR transfer request is not related to the failover/redundancy mechanism defined for GTP'. After the amended CDR transfer packet is assembled, reassembly unit 718 sends the amended CDR transfer request to CGF 720 through interface 712 (step 814).

CGF 720 then operates again according to process 900 (see FIG. 9). CGF 720 receives the amended CDR transfer request from CDF 710 through interface 722 (step 902). Processor 724 in CGF 720 opens the request, and stores the packet contents in storage unit 726. Verification unit 728 identifies the data record value inserted in a field of the amended CDR transfer request by CDF 710 to indicate a number of CDRs in the amended CDR transfer request (step 904). Verification unit 728 also counts the CDRs contained in the request (step 906), and compares the count of CDRs contained in the amended CDR transfer request with the number of CDRs indicated in the field of the amended CDR transfer request (step 908). If there is a match, then verification unit 728 does not detect a mismatch error (step 910), and may accept the amended CDR transfer request. If there is a mismatch, then verification unit 728 rejects the amended CDR transfer request (step 912). CGF 720 then sends a CDR transfer response to CDF 710 (step 916).

CDF 710 operates again according to process 800 (see FIG. 8). Processor 714 within CDF 710 receives the CDR transfer response from CGF 720 (step 806) for the amended CDR transfer request. Reassembly unit 718 processes the CDR transfer response to determine whether a count mismatch was identified in the CDR transfer request (step 808). If the CDR transfer request was accepted by CGF 720 and no count mismatch error was detected, then processor 714 in CDF 710 deletes the information for this transaction from its send buffer. For example, CDF 710 may delete the sequence number for this transaction from the send buffer (step 816 in FIG. 8). Processor 714 may also delete the successfully sent CDRs for the transaction from the send buffer (step 818). Processor 714 may take other desired steps to complete the request/response methodology for CDR transport.

The error handling described above advantageously increases the reliability of CDR transport. Transport protocols such as GTP' provide a mechanism for indicating if CDRs are lost, but OFCS vendors are penalized when CDRs are lost. The solution provided herein allows a CGF to identify when CDR may be lost, and notify the CDF of the error. The CDF can then reassemble a CDR packet so that CDRs are not lost. This advantageously avoids revenue loss for the network operator and penalties to the OFCS vendor.

EXAMPLE

FIG. 11 illustrates CDR transport using GTP' in an exemplary embodiment. To start, CDF 710 assembles a Data Record Transfer (DRT) request. In assembling the DRT request, CDF 710 populates the "Sequence Number" field of the GTP' header with the sequence number for this transaction (see FIG. 2). CDF 710 populates the Data Record Packet IE with the CDRs (e.g., in Data Record 1-$n$), and inserts a value in the "Number of Data Records" field to indicate the number of CDRs inserted in the Data Record Packet IE (see FIG. 4). CDF 710 then sends the DRT request to CGF 720.

CGF 720 receives the DRT request, and stores the packet contents. CGF 720 then determines whether or not there is a mismatch error in the DRT request. To do so, CGF 720 processes the DRT request to identify the value ("M") inserted in the "Number of Data Records" field of the Data Record Packet IE. CGF 720 also processes the DRT request to count the CDRs ("N") contained in the Data Record Packet IE. If there is a mismatch (M≠N), then CGF 720 detects a mismatch error and rejects the DRT request. CGF 720 assembles a DRT response for the DRT request with the same sequence number. CGF 720 inserts a cause value in the Cause IE of the DRT response that indicates "Count Mismatch", and sends the DRT response to CDF 710.

Upon receiving the DRT response indicating a count mismatch, CDF 710 reassembles the DRT request. This may include inserting a new value in the "Number of Data Records" field of the Data Record Packet IE. CDF 710 also inserts a value in the Amendment Indicator IE (see FIG. 10) indicating the DRT request is amended in response to having received an earlier rejection with a cause value of "Count Mismatch". CDF 710 maintains the same sequence number in the DRT request. CDF 710 does not declare the DRT request as a potentially duplicated Data Record Packet, as the DRT request is not related to the failover/redundancy mechanism defined for GTP'. CDF 710 then sends the DRT request to CGF 720.

CGF 720 receives the DRT request, and again determines whether or not there is a mismatch error in the DRT request. If there is no mismatch error, then CGF 720 assembles a DRT response for the DRT request, and inserts a cause value in the Cause IE of the DRT response that indicates "Request accepted" (assuming there are no other errors). CGF 720 then sends the DRT response to CDF 710.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

I claim:

1. An apparatus comprising:
   a Charging Gateway Function (CGF) of an offline charging system for handling Charging Data Records (CDRs);
   the CGF including a processor configured to receive an initial CDR transfer request from a Charging Data Function (CDF), to identify a data record value inserted in a field of the initial CDR transfer request by the CDF to indicate a number of CDRs in the initial CDR transfer request, to count the CDRs contained in the initial CDR transfer request, and to compare the count of CDRs contained in the initial CDR transfer request with the number of CDRs indicated in the field of the initial CDR transfer request;
   the CGF is configured to reject the initial CDR transfer request if the count of CDRs contained in the initial CDR transfer request does not match the number of CDRs indicated in the field of the initial CDR transfer request, to assemble a CDR transfer response that includes a cause value indicating a count mismatch, and to send the CDR transfer response to the CDF.

2. The apparatus of claim 1 wherein:
   the initial CDR transfer request comprises a GTP' Data Record Transfer Request; and
   the CGF is configured to process a Data Record Packet Information Element (IE) in the GTP' Data Record Transfer Request to identify the data record value, and to count the CDRs contained in the GTP' Data Record Transfer Request.

3. The apparatus of claim 2 wherein:
   the CDR transfer response comprises a GTP' Data Record Transfer Response; and
   the cause value is defined for the GTP' Data Record Transfer Response to indicate the count mismatch in the GTP' Data Record Transfer Request.

4. The apparatus of claim 3 wherein:
   the cause value is defined as "Count Mismatch".

5. The apparatus of claim 1 wherein:
   the CDF is configured to receive the CDR transfer response from the CGF that includes the cause value indicating the count mismatch, to reassemble the initial CDR transfer request to generate an amended CDR transfer request, to insert an amendment indicator in the amended CDR transfer request, and to send the amended CDR transfer request to the CGF;
   wherein a sequence number for the initial CDR transfer request is maintained in the amended CDR transfer request.

6. The apparatus of claim 5 wherein:
   the CDF is configured to receive another CDR transfer response from the CGF for the amended CDR transfer request indicating that the amended CDR transfer request was accepted by the CGF, and to delete an entry related to the sequence number from a send buffer.

7. The apparatus of claim 5 wherein:
   the amended CDR transfer request comprises a GTP' Data Record Transfer Request; and
   an Information Element (IE) is defined in the GTP' Data Record Transfer Request for the amendment indicator.

8. The apparatus of claim 7 wherein:
   the IE for the amendment indicator is defined as conditional.

9. A method for Charging Data Record (CDR) transfer in offline charging, the method comprising:
   receiving an initial CDR transfer request from a Charging Data Function (CDF) in a Charging Gateway Function (CGF) of an offline charging system;
   identifying a data record value inserted in a field of the initial CDR transfer request by the CDF to indicate a number of CDRs in the initial CDR transfer request;
   counting the CDRs contained in the initial CDR transfer request;
   comparing the count of CDRs contained in the initial CDR transfer request with the number of CDRs indicated in the field of the initial CDR transfer request;
   rejecting the initial CDR transfer request if the count of CDRs contained in the initial CDR transfer request does not match the number of CDRs indicated in the field of the initial CDR transfer request;
   assembling a CDR transfer response that includes a cause value indicating a count mismatch; and
   sending the CDR transfer response to the CDF.

10. The method of claim 9 wherein:
    the initial CDR transfer request comprises a GTP' Data Record Transfer Request; and
    the method further includes processing a Data Record Packet Information Element (IE) in the GTP' Data Record Transfer Request to identify the data record value, and to count the CDRs contained in the GTP' Data Record Transfer Request.

11. The method of claim 10 wherein:
    the CDR transfer response comprises a GTP' Data Record Transfer Response; and
    the cause value is defined for the GTP' Data Record Transfer Response to indicate the count mismatch in the GTP' Data Record Transfer Request.

12. The method of claim 11 wherein:
    the cause value is defined as "Count Mismatch".

13. The method of claim 9 further comprising:
    receiving the CDR transfer response from the CGF in the CDF that includes the cause value indicating the count mismatch;
    reassembling the initial CDR transfer request in the CDF to generate an amended CDR transfer request;
    inserting an amendment indicator in the amended CDR transfer request; and
    sending the amended CDR transfer request from the CDF to the CGF;
    wherein a sequence number for the initial CDR transfer request is maintained in the amended CDR transfer request.

14. The method of claim 13 further comprising:
    receiving another CDR transfer response in the CDF from the CGF for the amended CDR transfer request indicating that the amended CDR transfer request was accepted by the CGF; and
    deleting an entry related to the sequence number from a send buffer within the CDF.

15. The method of claim 13 wherein:
    the amended CDR transfer request comprises a GTP' Data Record Transfer Request; and
    an Information Element (IE) is defined in the GTP' Data Record Transfer Request for the amendment indicator.

16. The method of claim 15 wherein:

the IE for the amendment indicator is defined as conditional.

17. An apparatus comprising:

a Charging Data Function (CDF) configured to communicate with a Charging Gateway Function (CGF) of an offline charging system to transfer Charging Data Records (CDRs);

the CDF including a processor configured to assemble an initial CDR transfer request for a transaction, to insert CDRs in the initial CDR transfer request, to insert a data record value in a field of the initial CDR transfer request to indicate a number of CDRs in the initial CDR transfer request, and to send the initial CDR transfer request to the CGF;

the CDF is configured to receive a CDR transfer response for the transaction from the CGF that includes a cause value indicating a count mismatch between the data record value inserted by the CDF and a number of CDRs contained in the initial CDR transfer request as received by the CGF, to reassemble the initial CDR transfer request to generate an amended CDR transfer request, to insert an amendment indicator in the amended CDR transfer request, and to send the amended CDR transfer request to the CGF.

18. The apparatus of claim 17 wherein:

the CDR transfer response comprises a GTP' Data Record Transfer Response; and the cause value is defined for the GTP' Data Record Transfer Response to indicate a count mismatch in a Data Record Transfer Request.

19. The apparatus of claim 17 wherein:

the amended CDR transfer request comprises a GTP' Data Record Transfer Request; and an Information Element (IE) is defined in the GTP' Data Record Transfer Request for the amendment indicator.

20. The apparatus of claim 17 wherein:

the CDF is configured to assign a sequence number for the transaction, and to insert the sequence number in the initial CDR transfer request;

the CDF is configured to insert the sequence number in the amended CDR transfer request.

\* \* \* \* \*